US011781581B2

(12) United States Patent
Delaney

(10) Patent No.: US 11,781,581 B2
(45) Date of Patent: Oct. 10, 2023

(54) FIXING PIN

(71) Applicant: ELLSI LIMITED, Scunthorpe (GB)

(72) Inventor: Paul Delaney, Scunthorpe (GB)

(73) Assignee: ELLSI LIMITED, Scunthorpe (GB)

( * ) Notice: Subject to any disclaimer, the term of this patent is extended or adjusted under 35 U.S.C. 154(b) by 0 days.

(21) Appl. No.: 18/047,762

(22) Filed: Oct. 19, 2022

(65) Prior Publication Data

US 2023/0057402 A1 Feb. 23, 2023

Related U.S. Application Data

(63) Continuation of application No. PCT/GB2021/052619, filed on Oct. 11, 2021.

(30) Foreign Application Priority Data

Oct. 13, 2020 (GB) .................................... 2016244
Mar. 4, 2021 (GB) .................................... 2103043

(51) Int. Cl.
*F16B 13/06* (2006.01)
*F16B 19/00* (2006.01)
*A47K 13/26* (2006.01)

(52) U.S. Cl.
CPC ............ *F16B 19/002* (2013.01); *A47K 13/26* (2013.01); *F16B 13/066* (2013.01)

(58) Field of Classification Search
CPC .. F16B 19/1045; F16B 13/061; F16B 13/065; F16B 13/066; B66D 1/06; B66D 3/14; B66D 1/04; B66D 1/00; B66D 5/34; B66D 1/7431
USPC .................................... 411/34; 254/352, 357
See application file for complete search history.

(56) References Cited

U.S. PATENT DOCUMENTS

| | | | | |
|---|---|---|---|---|
| 1,854,103 A | * | 4/1932 | Buhrie | B66D 1/06 242/406 |
| 4,403,893 A | * | 9/1983 | Wollar | F16B 13/061 D8/385 |
| 4,566,750 A | * | 1/1986 | Umezu | F16B 13/061 439/877 |
| 4,703,917 A | * | 11/1987 | Tomlinson | B66D 1/04 254/369 |
| 5,059,193 A | * | 10/1991 | Kuslich | A61F 2/4455 606/279 |

(Continued)

FOREIGN PATENT DOCUMENTS

| JP | 2002125884 A | | 5/2002 |
|---|---|---|---|
| JP | 2002125884 A | * | 8/2002 |

OTHER PUBLICATIONS

International Preliminary Report and Written Opinion on Patentability for corresponding PCT application PCT/GB2021/052619 dated Apr. 21, 2022.

*Primary Examiner* — Flemming Saether
(74) *Attorney, Agent, or Firm* — Renner, Otto, Boisselle & Sklar, LLP

(57) ABSTRACT

A fixing pin having top section and a stem. The stem has an expandable section and a lower element adjacent thereto and the top section comprises a ratchet mechanism. The lower element of the stem is connected to the ratchet mechanism by a flexible connector, such that operation of the ratchet mechanism moves the lower element towards the top section, thereby compressing the expandable section axially and causing it to expand radially.

9 Claims, 2 Drawing Sheets

(56) References Cited

U.S. PATENT DOCUMENTS

| | | | |
|---|---|---|---|
| 6,641,116 B1* | 11/2003 | Huang | B60P 7/083 254/218 |
| 9,643,824 B2* | 5/2017 | Xiao | B66D 1/28 |
| 2013/0298381 A1 | 11/2013 | Owen | |

* cited by examiner

FIXING PIN

This application is a national stage filing of PCT/GB2021/052619 filed on Oct. 11, 2021. Which is herein incorporated by reference in its entirety.

FIELD OF THE INVENTION

The invention relates to a fixing, or retaining, pin, particularly for use in attaching toilet seats to toilet pans.

BACKGROUND TO THE INVENTION

Many devices for fixing two items together have been previously proposed, from bolts and nuts, through to complex expanding fixings, such as that shown in EP2729046 (Indesas Sarl) that employs a lever and cam mechanism to lock a toilet seat to a toilet pan. A problem with such fixings is that it can be difficult to operate a lever or cam in confined spaces, such as at the back of a toilet pan.

Where fixings are used on toilet seats, it can be difficult to properly accommodate for variations in the depth and diameter of the fixing holes in toilet pans. For example, the holes in toilet seat pans can vary by several millimetres and where pins cannot accommodate for such variations, it can make them very difficult to fix the seat reliably. This is especially true where a lever-cam mechanism is used because if the depth of the toilet pan hole is too great, the force required to move the lever to the locked position is too great. This can result in the lever-cam mechanism breaking or it can lead to damage to the toilet pan. Furthermore, lever mechanisms can be unsightly and aesthetically unappealing. Additionally, some people may be uncomfortable with using their fingers to touch the lever when it is attached to a toilet seat, because it may be considered unhygienic.

SUMMARY OF THE INVENTION

Accordingly, the present invention is directed to a fixing pin having section and a stem, the stem comprising an expandable section and a lower element,
 wherein the section comprises a ratchet mechanism;
 wherein the lower element of the stem is connected to the ratchet mechanism by a flexible connector, such that operation of the ratchet mechanism moves the lower element towards the expandable section, thereby compressing the expandable section axially and causing it to expand radially.

Thus, the present invention provides a fixing pin that has a section, which may be a top section, that can be situated against one side of a surface and an expandable section that can be partially received within an aperture and, when compressed axially so that it expands radially, the expandable section is partially situated on the other side of the surface. As the pin is placed into an aperture and both top surface and the expandable section are larger than the aperture, the pin fixes in place. The pin can be fitted onto another object, such as a toilet seat, a shelf or a picture frame, and the ratchet mechanism can be used to expand the expandable section and keep the required force on the expandable section to retain the pin in place. The ratchet mechanism allows the flexible connector to keep the compression force on the expandable section, and allows a user to readily release that, if needed.

By arranging a ratchet mechanism on the top section, the activation point, that is to say, the locating in which the fixing pin is operated, can be offset with respect to the axial position of the fixing pin. Thus, where there is limited access to the top of the fixing pin, the ratchet mechanism allows operation of the pin from a position adjacent the fixing pin. This is particularly beneficial in toilet seat fixings where there may be restricted access to the top of the fixing pin.

The expandable section is, preferably, a resiliently expandable section so that it has a natural tendency to return to its original length and thickness when force is removed therefrom. Thus, the expandable section may comprise a plastics material, such as an elastomeric material, or a rubber or rubber-like material.

It is preferable that the flexible connector passes axially through the expandable section and connects to the lower element. Where the flexible connector passes axially through the expandable section and, preferably, connects coaxially with the lower element, the force applied to the expandable section can be applied in a reliable and predicable manner. Additionally, it will not interfere with the peripheral surface of the expandable element.

Advantageously, the ratchet mechanism comprises a spindle about which the flexible member can be wound. In one arrangement, the flexible member passes from the ratchet mechanism to the lower element; however, in an alternative arrangement, a rigid, or semi-rigid shaft can connect to the lower element and the flexible member can connect between the shaft and the ratchet mechanism. Similarly, further components may be provided to connect the flexible connector to the lower element. Employing a spindle on the ratchet mechanism allows for a convenient location about which flexible be wound, thereby readily allowing the lower element to be brought towards the top section, whilst keeping the device relatively compact. The flexible member could simply pass through a holding element; however, using the spindle is a way to tidily store the flexible member and reduce the risk of the flexible member becoming damaged or caught.

The flexible member may be of any suitable length. It will be appreciated that the ratchet mechanism may be positioned away from the fixing pin and the flexible member connected between the ratchet mechanism and the lower element via a pathway. Such a pathway may comprise rotatable elements to allow easy movement of the flexible member therealong. In some arrangements, pulley wheels, rotating elements or slots may guide the flexible member along a pathway. This allows the ratchet mechanism to be positioned remotely from the stem and, in some arrangements, the section could be a "lower section" instead of a "top section" and it can be positioned on the underside of the fixing pin. In such an embodiment incorporated into a toilet seat, the ratchet mechanism is positioned underneath the toilet seat fixing and the flexible member can pass to the top surface, or within the seat, to operate the stem of the fixing pin. This allows for an aesthetically more appealing product with few, or no, parts of the fixing arrangement being visible from the top surface.

In one embodiment, the ratchet mechanism comprises a gear wheel and a pawl, although, alternatively, the ratchet mechanism may comprise a linear gear and a pawl. The ratcheting arrangement may employ a ratchet in the form of a gear wheel or a linear gear element. These two mechanisms both provide a simple way to create the ratchet arrangement. In a linear arrangement, especially where a spindle may be employed, it may be that further gears are used, including worm gears. In a further embodiment, the ratchet mechanism comprises resiliently yieldable material and a pawl acting thereupon. If there is a desire to avoid backlash in the ratchet mechanism, it may be advantageous to use a continuous ratchet mechanism of this type.

It may be desirable to have a lever connected to the ratchet mechanism to move the ratchet relative to the pawl. This is particularly the case with a gear wheel, where a lever can be used operate the ratchet mechanism to draw the lower element towards the top section, thereby compressing the expandable section. The lever may be permanently attached in place, or it may be removable. Furthermore, the lever may be used to release the pawl and allow the expandable element to be extended axially, thereby reducing its width and allowing the pin to be removed. A handle or a tool may be used to operate the ratchet mechanism.

The invention extends to a toilet seat comprising at least one pin, as set out herein, and to a toilet and toilet seat arrangement, wherein the toilet seat is connected to holes in a toilet pan by a fixing pin as set out herein.

BRIEF DESCRIPTION OF THE DRAWINGS

An embodiment of the invention will now be described, by way of example only, and with reference to the accompanying drawings, in which FIGS. 1 to 6 show different views of a retaining pin in accordance with the present invention and in which

DETAILED DESCRIPTION OF EXEMPLARY EMBODIMENTS

Figure 1:
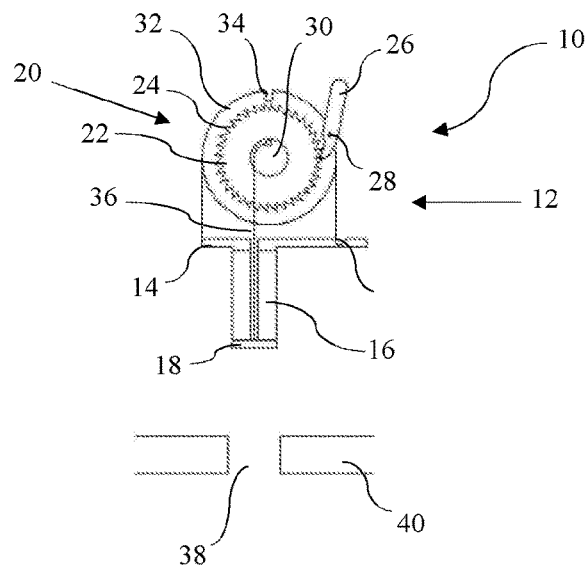
Figure 2:
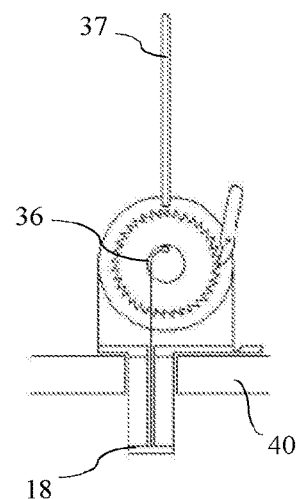
Figure 3:
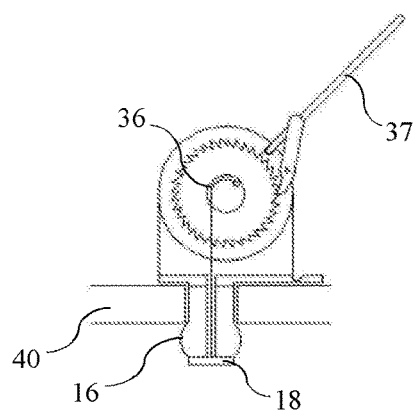
Figure 4:
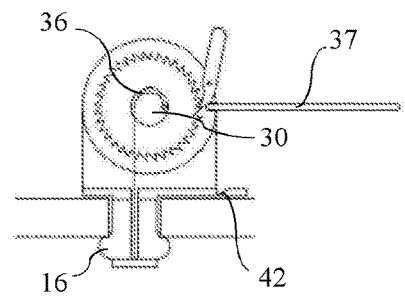
Figure 5:
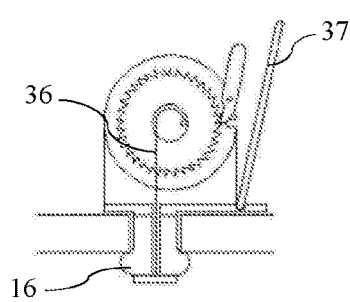
Figure 6:
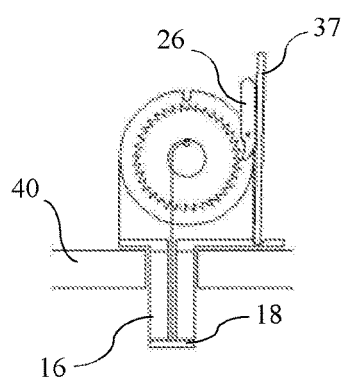

FIGS. 1 to 6 show a retaining pin 10 that has a top section 12 with a broad lower surface 14. Beneath the lower surface 12 is stem that comprises an expandable cylinder 16 and a circular lower element 18 is arranged adjacent the expandable cylinder 16 and distal from the lower surface 12. The expandable cylinder 16 is made from a resiliently yieldable elastomeric material.

Mounted on top of the broad lower surface 14 is a ratchet mechanism 20, that comprises a rotatable gear wheel 22 with teeth 24 around its circumference and a pawl 26, that pivots about a fulcrum 28 and is biased to engage the teeth 24 of the gear wheel 22. The gear wheel 22 rotates about a spindle 30 to which it is fixedly attached, thereby meaning that rotation of the gear wheel 22 results in direct rotation of the spindle 30. The gear wheel 22 and spindle 30 are connected to a turning wheel 32, although it will be appreciated that the any of parts may be integral to one another or can be separate elements that are joined to one another. The turning wheel 32 has at least one notch 34 in its periphery. As the turning wheel 32 rotates, the spindle 30 and the gear wheel rotate accordingly. The pawl 26, when in the biased position prevents rotation of the gear wheel 22 in one direction by engaging the teeth 24 and it allows movement in the other direction.

Attached to the spindle 30 is the first end of a flexible connector 36 that winds around the spindle 30 when the spindle 30 rotates. The other end of the flexible connector 36 is connected to the lower circular element 18, passing through the broad lower surface 14 and through the centre of the expandable cylinder 16.

A removable lever 37 is provided that can engage the notch 34 in the periphery of the turning wheel 32.

To fit the pin 10 into an aperture 38 in a surface 40, the stem of the pin 10 is placed into the aperture 38, with the broad lower surface 14 adjacent, and preferably in contact with, a first side of the surface 40 and the lower element 18 positioned on the opposing side of the surface 40. The expandable section 16 is positioned to be partially within the aperture 38 and extending through the aperture 38 beyond the second side of the surface 40.

Using the lever arranged in notch 34, the turning wheel 32 is rotated, so that the gear wheel 22 and the spindle 30 are rotated, which results in the flexible connector 36 winding around the spindle 30. At the same time, as the flexible connector 36 is wound onto the spindle 30, the lower circular element 18 is moved closer to the lower surface 14, which compresses the expandible cylinder 16, causing it to expand radially, thereby increasing is diameter. The lower circular element 18 is drawn towards the lower surface 12 until the expandable cylinder 16 cannot be compressed any further. At this point, the diameter of the expandable cylinder 16 is greater than the diameter of the aperture 38 on the second side of the surface 40, thereby preventing the lower circular element 18 passing back through the aperture 38 and the ratchet mechanism prevents the lower circular element 18 from moving away from the lower surface 12. Thus, the pin 10 is locked within the aperture 38, at which point the lever 37 can be removed from the notch 34 and stowed in a convenient location. The expandable cylinder 16 cannot expand within the aperture 38 and so it bulges outside the aperture 38, adjacent the second side of the surface 40.

To release the pin 10, the lever 37 is positioned within a release notch 42 in the lower surface and is rotated to a substantially vertical orientation. The body of the lever 37 then presses against the tail end of the pawl 26, pivoting against the bias, so that the pawl 26 disengages from the teeth 24 of the gear wheel 22. Due to the expandable cylinder 16 being resiliently yieldable, it returns to its original shape, or close thereto, narrowing its diameter to a size that allows it to pass back through the aperture 38, at which time, the lower circular element 18 can be withdrawn back through the aperture 38.

Figure 7:
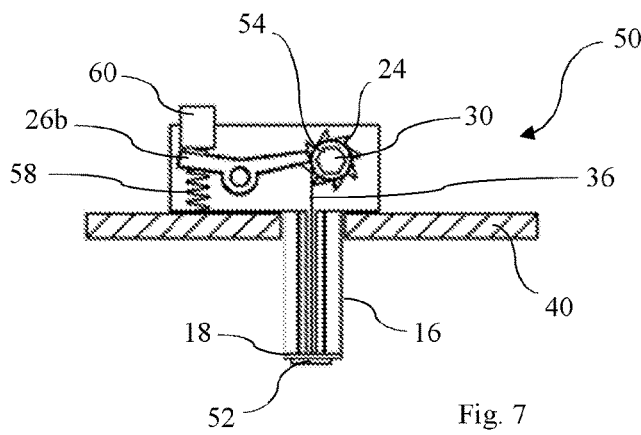
FIGS. 7 to 10 show different views of a second embodiment of a retaining pin in accordance with the present invention.
Figure 8:
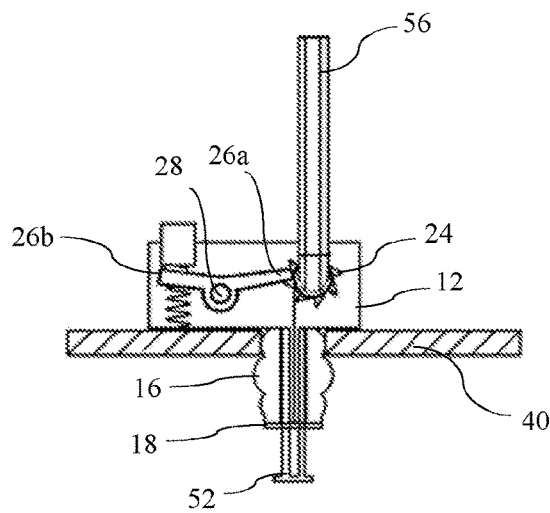
Figure 9:
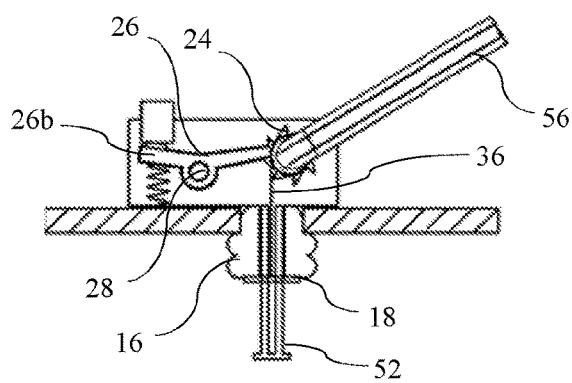
Figure 10:
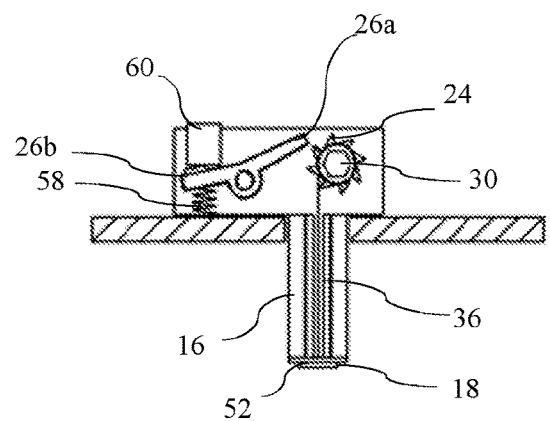

In the embodiment shown in FIGS. 7 to 10, there is provided a retaining pin 50, having a top section 12, from which extends an expandable cylinder 16 and a circular lower element 18 is arranged adjacent the expandable cylinder 16 and distal from the top section 12. The expandable cylinder 16 is made from a resiliently yieldable elastomeric material. Passing through both the expandable cylinder 16 and the lower element 18, and arranged coaxial therewith is a central core element 52. The central core element 52 is substantially rigid so as to resist deformation.

The top section 12 comprises a ratchet mechanism 20, that comprises a rotatable gear wheel 22 with teeth 24 around its circumference and a pawl 26, that pivots about a fulcrum 28. The rotatable gear wheel 22 is provided with a recess 54 therein to receive a hex-key 56. The pawl 26 comprises a pivoting lever that has a first end 26a that can engage the teeth 24 of the gear wheel 22, and a second end 26b. The second end 26b is biased by a compression spring 58 so that the rest position of the pawl 26 is engaged with the teeth 24 of the gear wheel 22. A release button 60 is provided adjacent the top surface of the second end 26b of the pawl 26 and operation of the release button 60 disengages the first end 26a of the pawl 26 from the teeth 24 of the gear wheel 22. Upon depressing the release button 60, the pawl 26 is biased by the spring 58 to reengage the teeth 24 of the gear wheel 22. The pawl 26, when in the biased position prevents rotation of the gear wheel 22 in one direction by engaging the teeth 24 and it allows movement in the other direction.

The gear wheel 22 rotates about a spindle 30 to which it is fixedly attached, thereby meaning that rotation of the gear wheel 22 results in direct rotation of the spindle 30 and vice versa. Attached to the spindle 30 is the first end of a flexible connector 36 that winds around the spindle 30 when the spindle 30 rotates. The flexible connector 36 passes through inside of the central core element 52 and the second end of the flexible connector 36 is connected to the lower element 18.

As the expandable cylinder 16 passes around the central core element 52, it will be appreciated that the flexible connector 36 also passes therethrough. Upon the flexible connector winding around the spindle 30, the lower element 18 moves along the central core element 52 towards the upper section 12 and in doing so compresses the expandable cylinder 16 in the axial direction, thereby causing radial expansion of the expandable cylinder 16.

To install the retaining pin 50, the flexible connector 36 is in its unwound position with the lower element 18 positioned at the lower end of the central core element 52, which is to say, distally from the upper section 12. In this position the axial length of the expandable cylinder 16 is at its longest and so its radial width is narrow. The expandable cylinder 16 is placed in an aperture in the surface 40 to which the pin 50 is to be attached. The hex key 56 is then engaged with the recess 54 in the gear wheel 22 and the hex key 56 is then rotated to wind the flexible connector 36 around the spindle 30. The pawl 26 engages the teeth 24 of the gear wheel 26 as it is rotated to prevent the unwinding of the flexible connector 36. Thus, the lower element 18 is drawn up the central core element 52, which causes axial compression of the expandable cylinder 16, thereby increasing the radial width of the expandable cylinder 16. The increased width of the expandable cylinder 16 prevents it from passing back through the aperture in the surface 40, thereby locking the pin onto the surface. When the desired compression of the expandable cylinder 16 is achieved, the hex key 56 is removed from the recess 54 and the retaining pin 50 is locked onto the surface 40.

To disengage the retaining pin 50, the release button 60 is depressed, which disengages the pawl 26 and allows the lower element 18 to pass back to the distal end of the central core element 52, thereby reducing the width of the expandable cylinder 16 and allowing the retaining pin 50 to be removed from the surface 40. Clearly, where the retaining pin is part of a toilet seat or other item, that toilet seat or other item will be affixed to the surface.

The expandable element may be affixed to the top section and to lower element; however, as they are connected to the flexible member, it is not necessary to fix them to one another. By having them adjacent one another, but not fixed together allows for the parts to rotate, which reduces the risk of torsional forces building up. It will be appreciated that spacers, washers and/or other items may be positioned between the expandable element, the top section and/or the lower element.

It will also be appreciated that the flexible connector may connect to the lower element or the spindle at a position along the length of the flexible connector that is not necessarily its end. The flexible connector is, preferably, in the form of a long, thin element, although it is envisaged that it could be in the form of a plurality of elements working in parallel. The, some, or all of such a plurality of elements may be positioned axially, non-axially or peripherally, relative to the expandable element. The expandable element and lower element, whilst being disclosed herein as possibly having a cylindrical shape, may be of any suitable shape, such as polygonal.

A notch, or both notches, may be replaced with an aperture or receiving loop into which the lever can be received. The lever may be foldable in order to stow in a more compact manner, or it may be formed of a plurality of parts that connect together to be used.

The turning wheel may, itself, comprise a ratchet mechanism, which could be a reversible ratchet mechanism. This allows the lever to be more easily operated to expand the expandable element. It is also envisaged that the spindle may be connected to a toilet seat that comprises a ratchet mechanism. Thus, the pin can be operated by using the ratchet system of the toilet seat, such that rotation of the toilet seat results in the tightening, or loosening, of the retaining pin.

The expandable section could be wholly positioned outside the aperture of the surface, potentially by using a spacer section; however, the expandable section being partially in the aperture and partially outside the aperture improves the grip of the device, due to the frictional contact between the walls of the aperture and the external surface of the expandable element. Similarly, part of the expandable section may protrude from the top surface and the bottom surface, so that the surface is sandwiched between the two ends of the expandable element.

The expandable section could be constructed from a pouch or pocket that comprises a gel, a liquid or a gas.

Where the pin is used on a toilet seat, two-dimensional positional variation may be provided so that the pin can accurately match up to the toilet pan holes. Thus, front-back and side-side movement of the pin, relative to any mounting bar or seat may be provided. This allows the seat to compensate for variations in the positions of the holes in the toilet pan.

Elements of one or more embodiment or arrangement disclosed herein may be incorporated into a different embodiment or arrangement. For example, the ratchet mechanism shown in the embodiment of FIGS. 7 to 10 may be incorporated into the arrangement shown in FIGS. 1 to 6 and vice versa.

The invention claimed is:

1. A fixing arrangement having a top section and a stem, the stem comprising a resiliently expandable section and a lower element, the top section comprising a ratchet mechanism;
    wherein the lower element of the stem is connected to the ratchet mechanism by a flexible connector such that operation of the ratchet mechanism moves the lower element towards the expandable section, thereby compressing the expandable section axially and causing it to expand radially; and
    wherein a substantially rigid core element is arranged coaxially with the expandable section and lower element, such that upon compression of the expandable section the lower element and the expandable section move relative to the core element.

2. A fixing arrangement according to claim 1, wherein the flexible connector passes axially through the expandable section and connects to the lower element.

3. A fixing arrangement according to claim 1, wherein the ratchet comprises a spindle about which the flexible member can be wound.

4. A fixing arrangement according to claim 1, wherein the ratchet mechanism comprises a gear wheel and a pawl.

5. A fixing arrangement according to claim 4, wherein the gear wheel comprises a recess for receiving a tool to rotate the gear wheel.

6. A fixing arrangement according to claim 1, wherein the ratchet mechanism comprises a resiliently yieldable material and a pawl acting thereupon.

7. A fixing arrangement according to claim 1, wherein a lever is connected to the ratchet mechanism to move the ratchet relative to the pawl.

8. A toilet seat comprising at least one fixing arrangement according to claim 1.

9. A toilet and toilet seat arrangement, wherein the toilet seat is connected to holes in a toilet pan by a fixing arrangement according to claim 1.

* * * * *